April 9, 1957
H. W. HEINE
2,788,128
LIQUID FILTER
Filed May 14, 1952
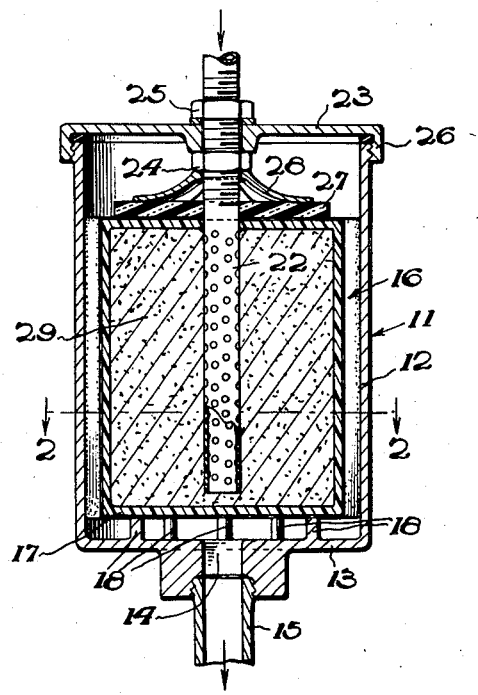
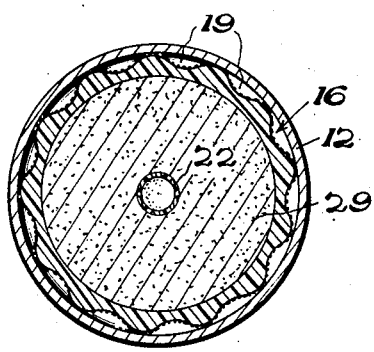
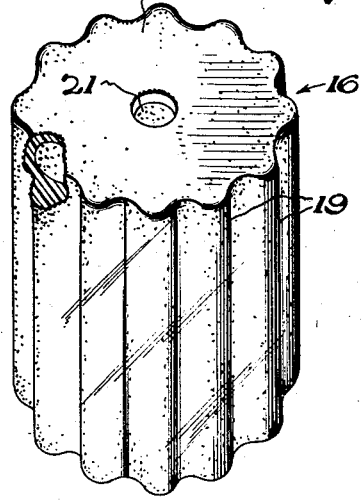
INVENTOR
Henry W. Heine.
BY
ATTORNEY

United States Patent Office 2,788,128
Patented Apr. 9, 1957

2,788,128

LIQUID FILTER

Henry W. Heine, Washington, D. C.

Application May 14, 1952, Serial No. 287,756

1 Claim. (Cl. 210—282)

This invention relates to liquid filters and has an important application to filters of the type used for cleaning lubricating oils in various engines, such as those of automobiles, airplanes, diesel locomotives, and other vehicles.

One of the objects of this invention is the provision of an oil filter for the purpose indicated which is highly efficient for prolonged operation.

Another object of the invention is to provide an oil filter which can be renewed without the replacement of any part or parts thereof.

A further object is the provision of an oil filter which minimizes the danger of foreign abrasive particles entering the lubricating system.

A still further object is to provide such a filter which contains no fibrous materials of any kind, such as paper, cloth, etc. and which, therefore, eliminates the danger of entrainment of particles from such materials in the oil stream and harming the parts of the machine being lubricated. It is known, for example, that paper may contain small particles of lignin, fillers, and other foreign abrasive matter. Such particles entering the lubricating system of a machine, produce excessive wear and erosion in direct opposition to the intended function of the oil which is to lubricate moving parts and prevent excessive wear.

A still further object of the invention is the provision of an oil filter of the type mentioned which employs very fine particles of a filter medium and, hence, is highly efficient, and means for containing the medium without danger of it entering the oil stream.

A still further object of the invention is the provision of an oil filter comprising a hollow container within which there is disposed a receptacle of a porous ceramic material containing finely divided diatomaceous earth as the filter medium, the ceramic receptacle being strong enough to withstand the oil pressures encountered in the lubricating system and having a porosity which permits the oil to flow freely therethrough, but which blocks the diatomaceous earth.

These and other objects and advantages of the invention will be apparent from the following description considered together with the accompanying drawing.

In the drawing:

Fig. 1 is a vertical section taken through an embodiment of the invention.

Fig. 2 is a section along the line 2—2 of Fig. 1.

Fig. 3 is a perspective view of the ceramic cup, apart from the other elements of the embodiment.

Referring with more particularity to the drawing in which like numerals designate like parts throughout the various views, the embodiment illustrated comprises a container 11, having a solid side wall 12, a solid bottom 13 and an open top. The bottom 13 is provided with an outlet opening 14 connected to an outlet pipe 15.

Within the container 11, there is disposed a ceramic chamber 16, the bottom 17 of which rests on a group of knobs 18 projecting upwardly from the bottom 17. Alternatively, these knobs may be made integral with the bottom 17 of the chamber to rest on the bottom 13, the purpose in either event being to maintain the bottom of the chamber 16 in spaced relation to the bottom of the container 11 and thus provide an unrestricted passageway for oil flowing into the outlet opening 14.

The chamber 16 is preferably of cylindrical shape and the lateral exterior surface thereof is fluted, as shown, to provide a plurality of vertical channels 19 communicating with the space at the bottom of the cup 16 and hence with the outlet pipe 15.

The top 20 of the chamber 16 has a central aperture 21 therethrough for the reception of a perforated inlet tube 22 which is adapted to be maintained concentrically within the chamber 16. The tube 22 is removably held in position by attachment to the cover 23 of the container 11. The cover is held between two nuts 24 and 25 threadedly engaging the tube 22, the cover itself being removably secured to the upper end of the container 11 by any suitable means, such as a threaded flange 26.

On top of the chamber 16, there is disposed about the tube 22, a thick disc or cushion 27 of soft non-porous material, such as non-porous rubber, and a spider washer 28 is disposed between the nut 24 and cushion 27. By these means, the chamber 16 is gently, but firmly, held in position against the knobs 18 and a liquid seal is provided between the tube 22 and the aperture 21. At the same time, the chamber 16 can be readily removed, by loosening the nut 25, removing the cover 23, and lifting the tube 22 out, which releases the chamber 16 for removal from the container 11.

The filter medium 29 is disposed within the chamber 16 and preferably comprises pulverized calcined diatomaceous earth. It is further preferred that the particle size of the filter medium be such that about 50% will pass through about a 120 mesh screen and that it be tightly packed in the cup.

In this respect, it is to be understood that the filtering action is effected principally by this filtering medium and that the primary function of the ceramic chamber 16 is to hold and contain the filtering medium. In order to do this, a problem which has not been heretofore successfully overcome, it is preferred that the ceramic chamber be of a special type. There are many ceramic materials known, but they are not, generally, suitable for this purpose because they may lack porosity or sufficient porosity or, on the other hand, they may be too porous to contain the finely divided diatomaceous earth. Diatomaceous earth is a well-known filter material and highly efficient in its action, but it has not been heretofore successfully used in devices of the present type, because of the lack of a suitable container therefor. Containers of paper, cloth, and other relatively soft materials are entirely unsuited, because they cannot withstand the pressures and they tend to rupture or disintegrate wholly or partially. It is for this reason that it is important to provide a rigid container of a material which is not deficient in these respects.

I have found that a ceramic material prepared in accordance with U. S. Patent No. 2,552,553 and my co-pending applications for patent, Serial No. 188,902, filed October 6, 1950; Serial No. 219,510, now Patent No. 2,702,748, dated February 22, 1954, filed April 5, 1951; Serial No. 242,774, filed April 12, 1951, now abandoned, and Serial No. 268,671, filed January 28, 1952, now abandoned are particularly suited for these chambers. Accordingly, I prefer to make these chambers of such ceramic materials, a preferred chamber comprising a ceramic material formed by baking raw diatomaceous earth having a saturated water content under conditions where the water smoking and baking are accomplished substantially simultaneously, thereby developing a very fine porous structure which can contain very finely divided diatomaceous earth powder and other similar filter media.

I also prefer to provide the outer surface of the chamber with a porous glaze in accordance with the procedures described in my Patent No. 2,681,865. Such a glaze adds strength to the chamber and furnishes a hard surface to the exterior of the chamber which resists crushing under the pressures encountered. In this respect, it is to be understood that the size of the chamber is such as to fit snugly within and rest against the side wall of the container 11. The outer edges of the channels 19 are in abutting relation with the said wall, as illustrated.

Oil entering the tube 22 passes downwardly therein and escapes through the perforations thereof, then through the packed filter medium 29, out through the wall of the chamber 16, into the channels 19 and the space at the bottom of the chamber 16, from whence it is discharged through the outlet 14 into the pipe 15.

After prolonged use, the filter medium may become so clogged with foreign particles as to reduce throughput capacity. Accordingly, it is desirable to clean or replace the filter medium periodically. The filter medium is readily cleaned by removing it from the chamber 16 and treating it with a suitable solvent, such as gasoline, Stoddard's solvent, etc., and/or separating foreign particles therefrom physically in any suitable manner known, such as by flotation or gravity separation. Consequently, the device may be operated indefinitely without the replacement of any part or parts.

I claim:

A filter device for liquids containing impurities in the form of solid particles, said filter comprising a receptacle including, a chamber having a porous ceramic wall whose outer surface is fluted and covered with a reinforcing glaze and a porous mass of finely divided particles packed in said chamber, said finely divided particles being insoluble in the liquid to be filtered, said porous mass being pervious to the liquid and impervious to the said impurities, said ceramic wall being pervious to the liquid and impervious to the said particles of the porous mass, said receptacle having a wall parallel to the ceramic wall and in contact with the glaze thereon, said receptacle also having a bottom wall and means for supporting the chamber in spaced relation above said bottom wall, said receptacle also having a bottom liquid outlet, a cover member for said receptacle, a liquid inlet pipe disposed through said cover member in communication with the interior of said chamber and a removable liquid seal member between said chamber and pipe.

References Cited in the file of this patent

UNITED STATES PATENTS

| | | |
|---|---|---|
| 496,614 | Lansingh | May 2, 1893 |
| 568,787 | Oster | Oct. 6, 1896 |
| 645,238 | Simpson | Mar. 13, 1900 |
| 880,558 | Metcalf | Mar. 3, 1908 |
| 1,153,282 | Zahm | Sept. 14, 1915 |
| 1,193,335 | Acheson | Aug. 1, 1916 |
| 1,828,767 | Diamond | Oct. 27, 1931 |
| 1,877,481 | Prouty | Sept. 13, 1932 |
| 1,999,371 | Parsons | Apr. 30, 1935 |
| 2,150,588 | Pitt | Mar. 14, 1939 |
| 2,330,129 | Lucas et al. | Sept. 21, 1943 |
| 2,367,745 | Wicks | Jan. 23, 1945 |
| 2,376,739 | Walker | May 22, 1945 |
| 2,381,627 | Thompson | Aug. 7, 1945 |
| 2,436,077 | Robertson | Feb. 17, 1948 |
| 2,555,970 | Hudson | June 5, 1951 |